US012023937B2

(12) United States Patent
Lum et al.

(10) Patent No.: US 12,023,937 B2
(45) Date of Patent: Jul. 2, 2024

(54) RECIRCULATION BYPASS

(71) Applicant: Hewlett-Packard Development Company, L.P., Spring, TX (US)

(72) Inventors: Jacob M. Lum, Corvallis, OR (US); Si-lam J. Choy, Corvallis, OR (US); Jeffrey R. Pollard, Corvallis, OR (US); Tsuyoshi Yamashita, Corvallis, OR (US); Jeremy Sells, Corvallis, OR (US); Garrett E. Clark, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 130 days.

(21) Appl. No.: 17/798,902

(22) PCT Filed: Mar. 11, 2020

(86) PCT No.: PCT/US2020/022034

§ 371 (c)(1),
(2) Date: Aug. 11, 2022

(87) PCT Pub. No.: WO2021/183121

PCT Pub. Date: Sep. 16, 2021

(65) Prior Publication Data

US 2023/0103786 A1 Apr. 6, 2023

(51) Int. Cl.

*B41J 2/18* (2006.01)
*B41J 2/14* (2006.01)

(52) U.S. Cl.

CPC ............... *B41J 2/18* (2013.01); *B41J 2/1408* (2013.01)

(58) Field of Classification Search

CPC .......................................................... B41J 2/18
See application file for complete search history.

(56) References Cited

U.S. PATENT DOCUMENTS

| | | | |
|---|---|---|---|
| 8,616,689 | B2 | 12/2013 | Von Essen et al. |
| 8,657,420 | B2 | 2/2014 | Hoisington et al. |
| 8,672,463 | B2 | 3/2014 | Essen et al. |
| 9,162,453 | B2 | 10/2015 | Cruz-Uribe et al. |
| 9,724,926 | B2 | 8/2017 | Keefe et al. |
| 2013/0293641 | A1 | 11/2013 | Essen et al. |

(Continued)

FOREIGN PATENT DOCUMENTS

| | | |
|---|---|---|
| CN | 102036829 A | 4/2011 |
| CN | 103381708 A | 11/2013 |

(Continued)

*Primary Examiner* — Julian D Huffman
(74) *Attorney, Agent, or Firm* — Foley & Lardner LLP

(57) ABSTRACT

A fluid ejection die may include a fluid actuator, a substrate supporting the fluid actuator, a chamber layer supported by the substrate and a bypass passage in the substrate. The substrate may include a closed inlet channel having an inlet opening for connection to an outlet of a fluid source and an outlet channel having an outlet opening of a first size for connection to an inlet of the fluid source. The chamber layer includes a recirculation passage to supply fluid for ejection by the fluid actuator through an ejection orifice and to circulate fluid across the fluid actuator from the closed inlet channel to the outlet channel. The bypass passage is of a second size less than the first size and connects the inlet channel to the inlet of the fluid source while bypassing any fluid actuator provided for ejecting fluid through an ejection orifice.

16 Claims, 12 Drawing Sheets

(56) References Cited

U.S. PATENT DOCUMENTS

| | | | |
|---|---|---|---|
| 2014/0063132 | A1 | 3/2014 | Scheffelin et al. |
| 2020/0238695 | A1 | 7/2020 | Chen et al. |

FOREIGN PATENT DOCUMENTS

| | | | |
|---|---|---|---|
| CN | 103635261 | A | 3/2014 |
| CN | 110325372 | A | 10/2019 |
| WO | 2019/078868 | A1 | 4/2019 |
| WO | 2019/108235 | A1 | 6/2019 |
| WO | 2019/209250 | A1 | 10/2019 |

RECIRCULATION BYPASS

BACKGROUND

Fluid ejection dies are used to selectively eject droplets of fluid. Such fluid ejection dies may include a fluid actuator that displaces fluid through an ejection orifice. The fluid may be pumped to the fluid actuator from a fluid source.

Figure 1:
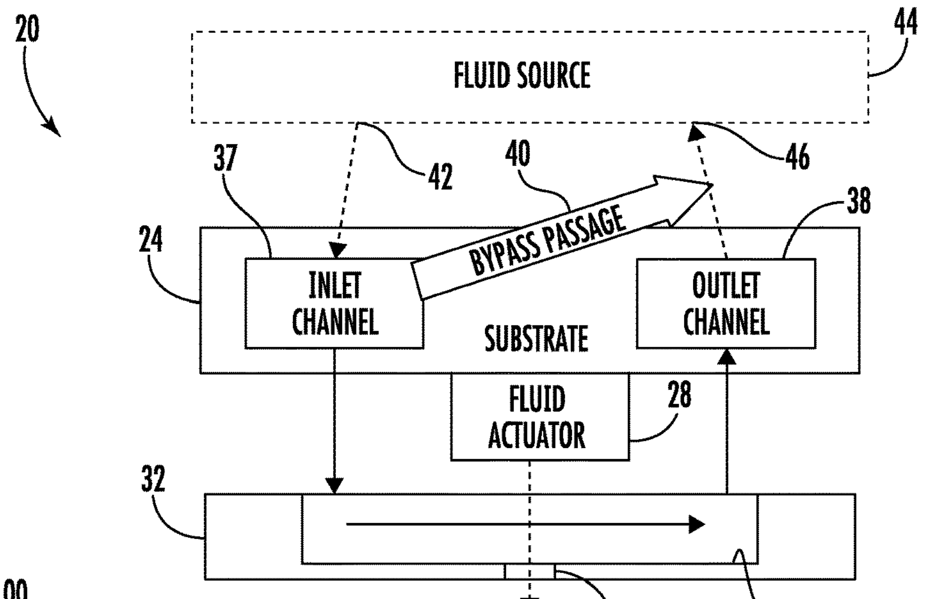
FIG. 1 is a side view schematically illustrating portions of an example fluid ejection die.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are fluid ejection dies and methods that utilize pumped fluid to reduce particle settling in the fluid and to cool the fluid ejection die. Particles, such as ink pigments, within the fluid being supplied to the fluid actuator may settle. Such settling may block the ejection orifice or otherwise impair performance of the fluid ejection die. The disclosed fluid ejection dies and methods recirculate the pumped fluid across the fluid actuator of a fluid ejector to reduce settling.

However, bulk fluid recirculation may result in a high pressure drop across the fluid actuator, reducing overall fluid flow. Such a reduction in the overall flow of fluid through the fluid ejection die may result in a heat buildup which may also impair performance of the fluid ejection die. The disclosed fluid ejection dies and methods provide additional fluid flow or fluid recirculation by allowing some of the pumped fluid to bypass the fluid actuator through a bypass passage. The additional fluid flow across the bypass passage provides enhanced cooling of the fluid ejection die. The circulating flow rate of fluid may also facilitate a more uniform and constant temperature across the different fluid ejectors for more reliable and consistent fluid ejection or printing performance.

The disclosed hybrid fluid circulation across both recirculation passages and bypass passages offers benefits in printers that utilize high print flux duty cycles to meet print flux demands while providing marginal flow across fluid ejectors to inhibit remnant air bubble accumulation and viscous plug formation. The bypass circulation passages enhance fluid flow to provide enhanced convective cooling for isothermal printing at lower total pressure drops. As result, a fluid ejection die may operate with high duty cycles while meeting print flux and nozzle health demands. For example, a print head designed to print fluid formulations with high weight percent solids at lower duty cycles may benefit by ratioing a larger portion of the recirculation flow across the fluid ejectors (between the fluid actuators and associated ejection orifices) to reduce viscous plug formation in the bore or ejection orifice. The size, number and distribution of multiple bypass passages in parallel may be modulated to enhance flow uniformity across the fluid ejectors and to tune the fluid flow characteristics to a particular print application.

Disclosed are example fluid ejection dies that may include a fluid actuator, a substrate supporting the fluid actuator, a chamber layer supported by the substrate and a bypass passage in the substrate. The substrate may include a closed inlet channel having an inlet opening for connection to an outlet of a fluid source and an outlet channel having an outlet opening of a first size for connection to an inlet of the fluid source. For purposes of this disclosure, the term "closed" when referring to an inlet channel or outlet channel shall mean that the channel does not lead to a destination, but has a dead end or closed end, wherein fluid flow is towards the closed end. To exit such a closed channel, fluid flows through openings connected to the sides, floor and/or ceiling of the channel. In the illustrated examples, fluid exits the closed inlet channel by flowing through recirculation passages and bypass passages. In different implementations, outlet channel may be closed or may instead lead to a return for fluid source 44.

The chamber layer includes a recirculation passage to supply fluid for ejection by the fluid actuator through an ejection orifice and to circulate fluid across the fluid actuator from the closed inlet channel to the outlet channel. The bypass passage is of a second size less than the first size and connects the inlet channel to the inlet of the fluid source while bypassing any fluid actuator provided for ejecting fluid through an ejection orifice.

Disclosed are example fluid ejection methods. The example methods circulate fluid from a closed inlet channel that receives fluid from an outlet of a fluid supply to an outlet channel of a substrate of a fluid ejection die through a recirculation passage within a chamber layer of a fluid ejection die and across a fluid actuator that is supported by the substrate. The fluid actuator is to eject droplets of fluid from the recirculation passage through an ejection orifice. The method further includes circulating fluid from the closed inlet channel to the inlet of the fluid supply through a bypass passage within the substrate so as to bypass any fluid actuator provided for ejecting droplets through an ejection orifice.

Disclosed are example methods for forming example fluid ejection dies. The example methods may include providing a substrate supporting a fluid actuator, the substrate forming an inlet channel and outlet channel, the outlet channel having an outlet opening of a first size for connection to an inlet of a fluid source. The methods may include forming a second layer on the substrate, the second layer comprising a recirculation passage associated with the fluid actuator to supply fluid for ejection by the fluid actuator through an ejection orifice and to circulate fluid across the fluid actuator from the inlet channel to the outlet channel. The methods may include forming a bypass passage of a second size less than the first size in the substrate to connect the inlet channel to the outlet while bypassing any fluid actuator provided for ejecting fluid through an ejection orifice.

FIG. 1 schematically illustrates portions of an example fluid ejection die 20. Fluid ejection die 20 provides for fluid circulation across both recirculation passages and bypass passages. Fluid circulation across the recirculation passages and across the fluid ejectors may inhibit remnant air bubble accumulation and viscous plug formation. Fluid circulation through the bypass passages may enhance fluid flow to provide enhanced convective cooling for isothermal printing at lower total pressure drops. Fluid ejection die 20 comprises substrate 24, fluid actuator 28, chamber layer 32 and bypass passage 40.

Substrate 24 comprises a layer or multiple layers of material that form an inlet channel 37 and an outlet channel 38. Inlet channel 37 may be directly or indirectly connected to an outlet 42 of a fluid source which supplies the fluid to be ejected, under pressure. The pressurized fluid is supplied to fluid actuator 28 from the fluid source 44 through inlet channel 37. Outlet channel 38 may be directly or indirectly connected to an inlet 46 of the fluid source 44 to redirect fluid back to the fluid source 44.

In one implementation, substrate 24 may comprise a layer or multiple layers of silicon. In yet other implementations, substrate 24 may comprise other materials.

Fluid actuator 28 comprises a device that displaces fluid within an adjacent void or volume through an associated or corresponding ejection orifice 47 provided in chamber layer 32. Fluid actuator 28 is supported by substrate 24. In one implementation, electrically conductive traces, switches/transistors and other electronic componentry associated with the powering and control of fluid actuator 28 are also supported by substrate 24.

In one implementation, fluid actuator 28 may comprise a thermal resistor which, upon receiving electrical current, heats to a temperature above the nucleation temperature of the fluid so as to vaporize a portion of the adjacent fluid to create a bubble which displaces the fluid through the associated orifice 47. In other implementations, the fluid actuator 28 may comprise other forms of fluid actuators. In other implementations, the fluid actuator may comprise a fluid actuator in the form of a piezo-membrane based actuator, an electrostatic membrane actuator, mechanical/impact driven membrane actuator, a magnetostrictive drive actuator, an electrochemical actuator, and external laser actuators (that form a bubble through boiling with a laser beam), other such microdevices, or any combination thereof.

Layer 32 is coupled to substrate 24. Layer 32 forms recirculation passage 48. Recirculation passage 48 is associated with fluid actuator 28 to supply fluid for ejection by fluid actuator 28 through ejection orifice 47. Recirculation passage 48 extends directly below or adjacent to fluid actuator 28, between fluid actuator 28 and ejection orifice 47. In addition to supplying fluid for ejection by fluid actuator 28, recirculation passage 48 also circulates fluid across the fluid actuator 28 from inlet channel 37 to outlet channel 38. Such recirculation reduces settling of particles suspended within the fluid, such as ink pigments. Although schematically illustrated as having a uniform width and height, it should be appreciated that recirculation passage 48 may vary along its width and/or height. In some implementations, recirculation passage 48 may have a different shape or size between fluid actuator 28 and ejection orifice 47 so as to form an ejection chamber.

In some implementations, layer 32 is formed from a photo-imageable epoxy. In some implementations, layer 32 is formed from SU8. In some implementations, layer 32 may be formed from other materials or combination of materials.

Bypass passage 40 comprises a passage or multiple separate or interconnected passages that extend partially, if not entirely, within substrate 24 and that directly or indirectly connect inlet channel 37 to the inlet 46 of fluid source 44. Bypass passage 40 has a size less than a size of an outlet opening of channel 38 connecting channel 38 to the inlet 46 of fluid source 44 such that a portion of the fluid supplied to inlet channel 37 still circulates across recirculation passage 48. In implementations where bypass passage 40 comprises multiple fluid passages, the collective cross-sectional area of the multiple fluid passages is such that the total flow through such passages is less than the total flow through the outlet opening of channel 38 to the inlet 46 of fluid source 44 such that a portion of the fluid supplied to inlet channel 37 still circulates across recirculation passage 48. In some implementations, at least some, but less than 50% of the total fluid supplied inlet channel 37 passes through the fluid passage or multiple fluid passages forming bypass passage 40, whereas the remaining fluid supplied inlet channel 37 circulates across the collection of recirculation passages of die 20.

In some implementations, bypass passage 40 comprises a fluid passage extending directly between inlet channel 38 and outlet channel 38 of substrate 24, such as through a wall or rib that separates the two channels. Such a bypass passage 40 may comprise multiple passages, such as passages interspersed along the length of channel 37, 38 or such as panels arranged at the ends of channels 37 and 38.

In some implementations, bypass passage 40 may comprise a fluid passage that extends through a roof or ceiling of inlet channel 37 to the inlet 46 of fluid source 44. For example, bypass passage 40 may comprise a fluid passages extend through the ceiling of inlet channel 37 to another fluid passage that is returning fluid to fluid source 44, through the inlet 46 of fluid source 44. In some implementations, the bypass passage 40 extending through the ceiling may comprise a single slot or opening or may comprise an array of holes.

In some implementations, bypass passage 40 may comprise a fluid passage that extends through a floor of inlet channel 37, across and within substrate 24 to the outlet channel 38. Such a passage may extend through the floor, top or side of outlet channel 38. In some implementations, bypass passage 40 may comprise combinations of each of a passage extending through a rib between channels 37, 38, a passage extending through a roof of channel 37 and a passage extending through the floor of inlet channel 37 to the outlet channel 38. In some implementations, additional bypass passages may be provided in chamber layer 32 which facilitate the circulation of fluid from inlet channel 37 to outlet channel 38 within chamber layer 32 without the fluids circulating across any fluid actuator that is provided for ejecting fluid through a corresponding ejection orifice.

Figure 2:
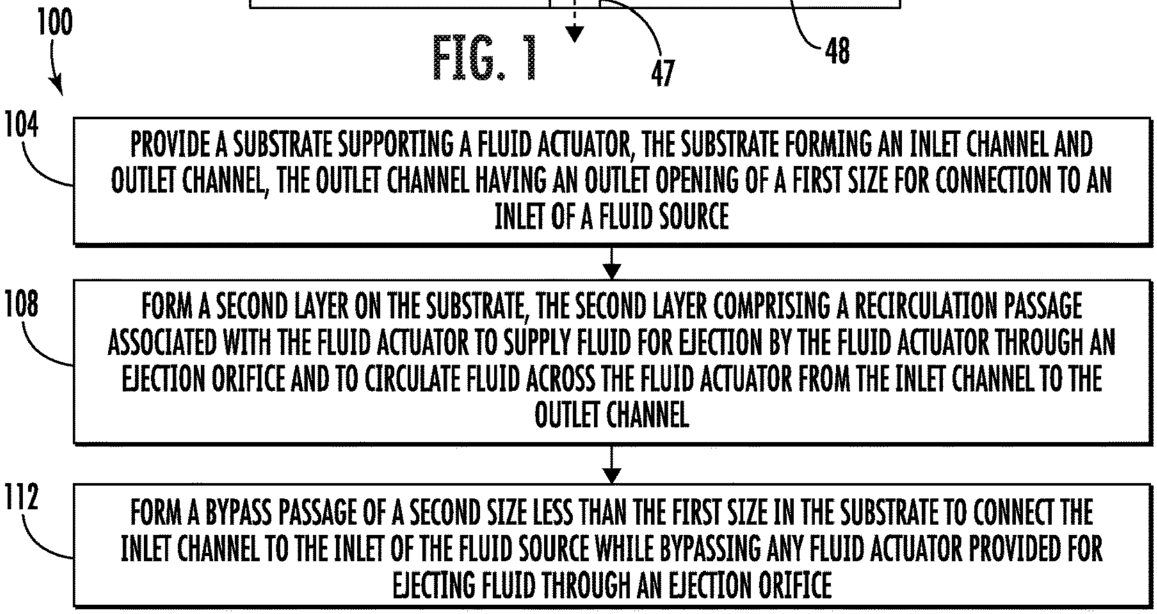
FIG. 2 is a flow diagram illustrating an example method for forming an example fluid ejection die.

FIG. 2 is a flow diagram of an example method 100 that may be used to form a fluid ejection die, such as the example fluid ejection die 20 shown in FIGS. 1A, 1B and 1C. As indicated by block 104, a substrate, such as substrate 24 is provided. The provided substrate supports a fluid actuator, such as fluid actuator 28, and forms an inlet channel and an outlet channel. The outlet channel has an outlet opening of a first size for connection to an inlet of a fluid source, such as fluid source 44. Substrate 24 may be molded to form channels 37 and 38 or may undergo material removal processes, such as sawing, etching and the like to form channels 36 and 38. Channel 37 and 38 may be formed through masking and etching processes. The fluid actuator may be bonded to or encapsulated within substrate 24. Electronic circuitry associated with the fluid actuator may be formed within or patterned on substrate 24.

As indicated by block 108, a second layer, such as layer 32, is formed. The second layer is formed so as to have a recirculation passage, such as recirculation passage 48, across the fluid actuator supported by the substrate. The recirculation passage is to supply fluid for ejection by the fluid actuator through an ejection orifice and to circulate fluid across the fluid actuator from the inlet channel to the outlet channel.

In some implementations, the second layer may be molded so as to form the recirculation passage and the bypass passage. In some implementations, the second layer may undergo material removal processes or patterning processes such as photolithography and etching to form the recirculation passage and the bypass passage. For example, in implementations where the second layer is formed from a photo-imageable epoxy, masking and etching processes may be applied to form the recirculation passage. In yet other implementations, a combination of different processes may be used to form the recirculation passage and the bypass passage.

As indicated by block 112, a bypass passage, such as bypass passage 40, is formed in substrate 24. The bypass passage is of a second size less than the first size. The bypass passage connects the inlet channel to the outlet channel while bypassing any fluid actuator provided for ejecting fluid through an ejection orifice. In some implementations, the bypass passage 40 is formed prior to the joining of the second layer to the substrate. In some implementations, bypass passage 40 may be formed by molding or may be formed by the application of various material removal processes, such as etching, sawing and the like. In some implementations, bypass passage 40 may be formed by using various masking techniques or photolithography.

Figure 3:
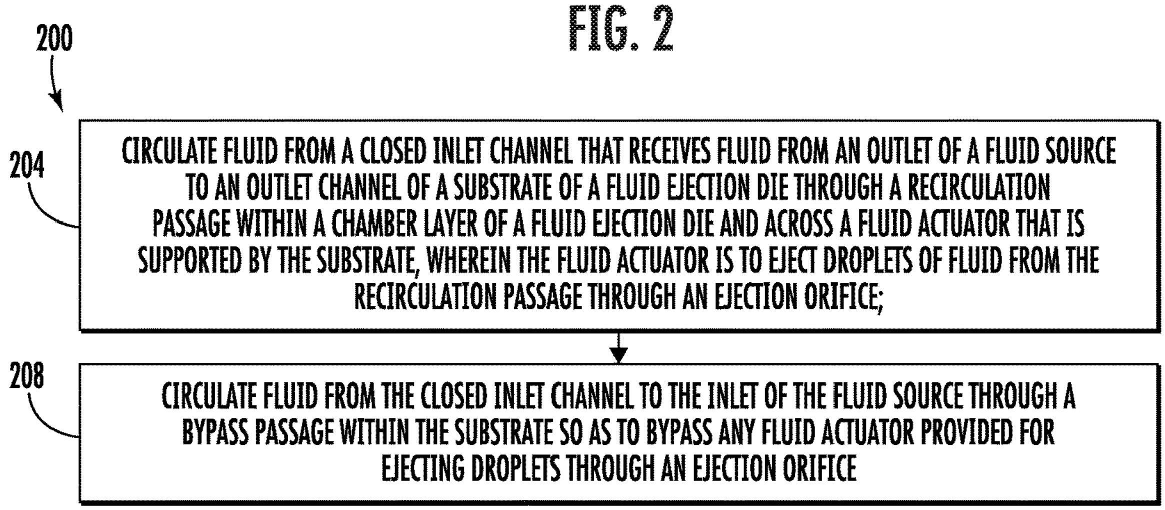
FIG. 3 is a flow diagram illustrating an example fluid ejection method.

FIG. 3 is a flow diagram of an example fluid ejection method 200. Method 200 reduces settling of particles within the fluid being ejected by recirculate fluid across a fluid actuator, between the fluid actuator and a corresponding ejection orifice. Method 200 additionally enhances the overall flow of fluid through a fluid ejection die by allowing a portion of the fluid to bypass the fluid actuator, enhancing the cooling of the fluid ejection die.

As indicated by block 204, fluid is circulated from a closed inlet channel that receives fluid from an outlet of a fluid source, such as source 44, to an outlet channel of the substrate of a fluid ejection die through a recirculation passage within a chamber layer of the fluid ejection die and across a fluid actuator that is supported by the substrate. The fluid actuator is to eject drops of fluid from the recirculation passage through an ejection orifice.

As indicated by block 208, fluid is further circulated from the close inlet channel to the inlet of the fluid supply through a bypass passage within the substrate so as to bypass any fluid actuator provided for ejecting droplets through an ejection orifice.

Figure 4A:
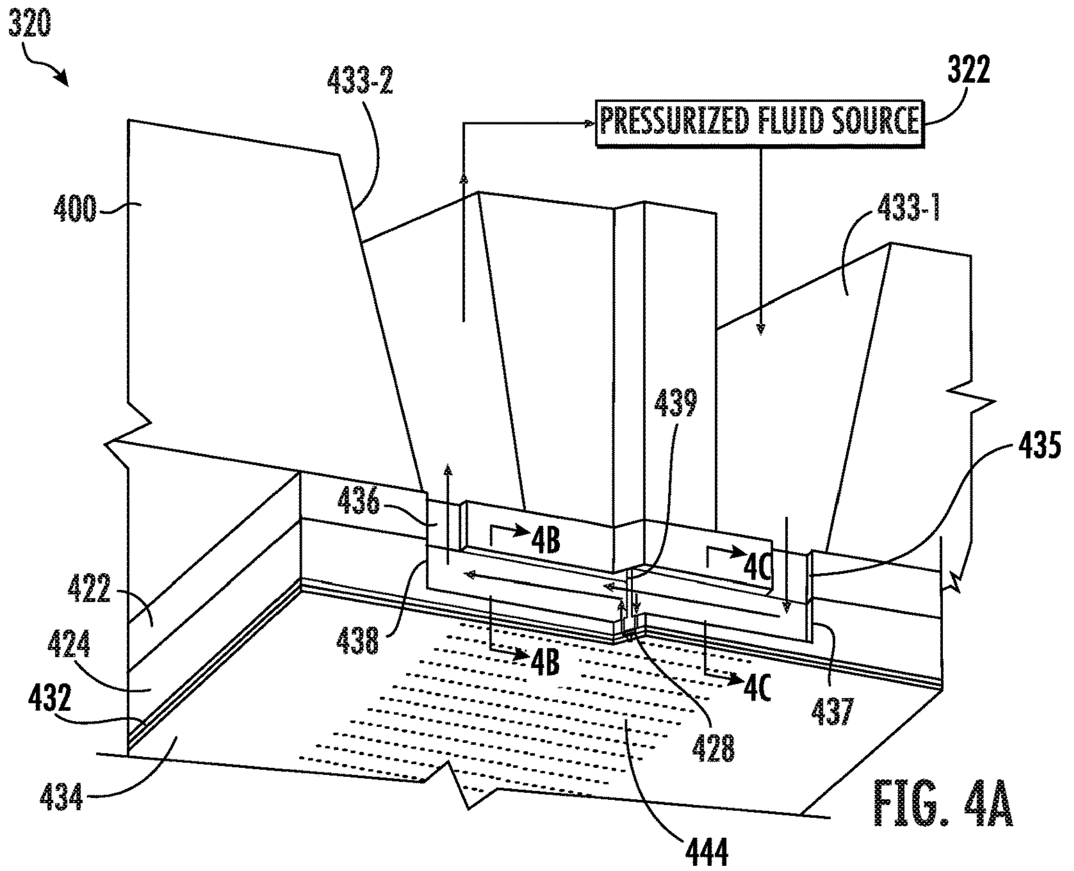
FIG. 4A is a perspective view of a cross-section through portions of an example fluid ejection die.
Figure 4B:
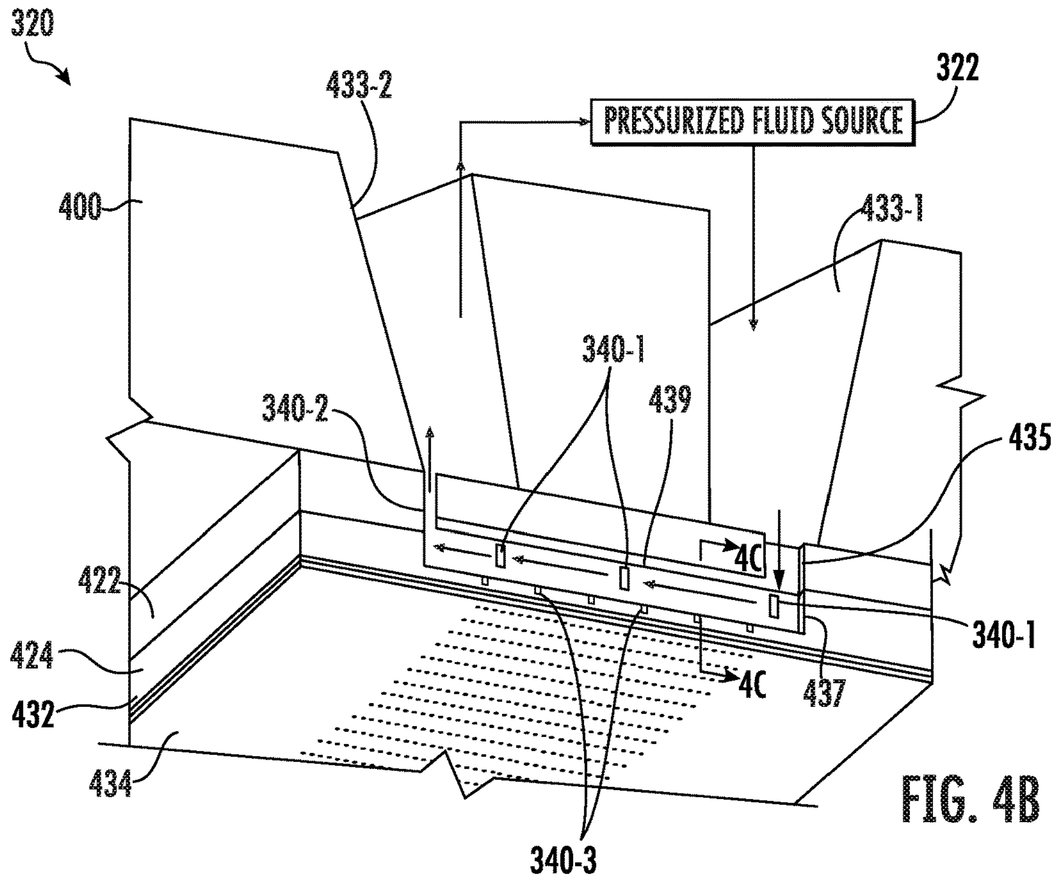
FIG. 4B is a perspective view of a cross-section through portions of the example fluid ejection die of FIG. 4A.
Figure 4C:
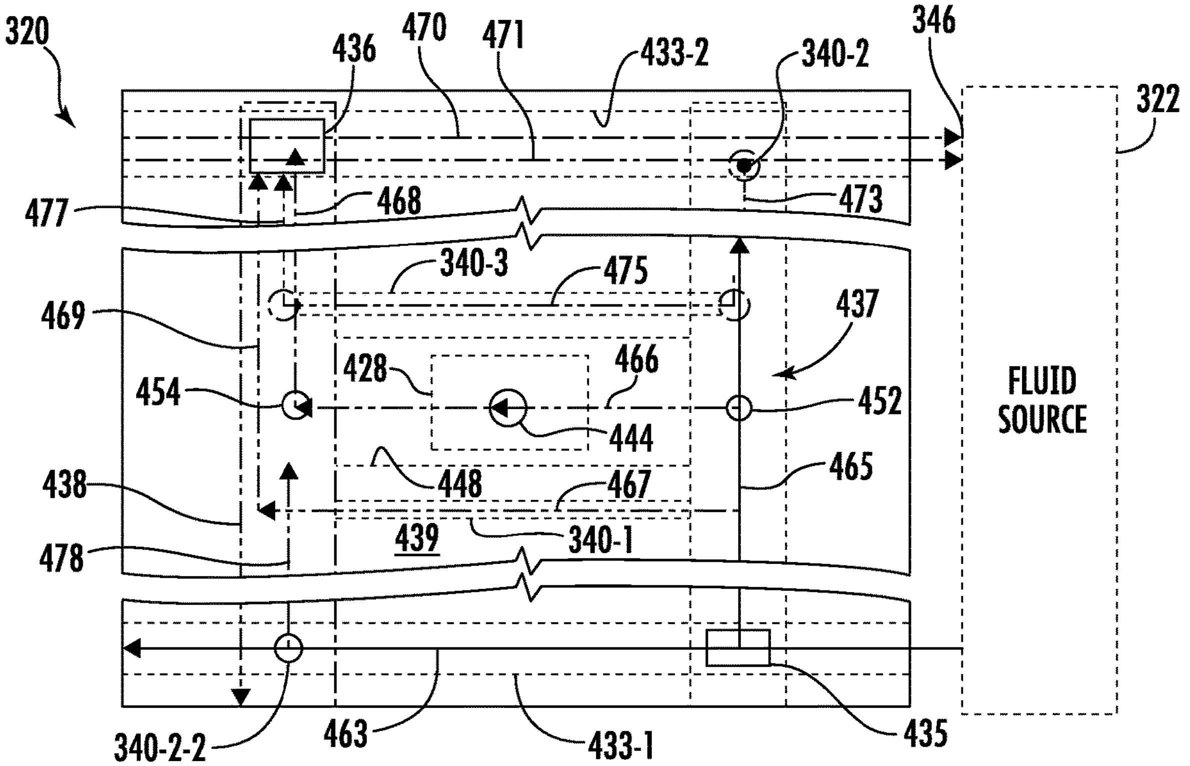
FIG. 4C is a bottom view schematically illustrating portions of the example fluid ejection die of FIG. 4A.
Figure 4D:
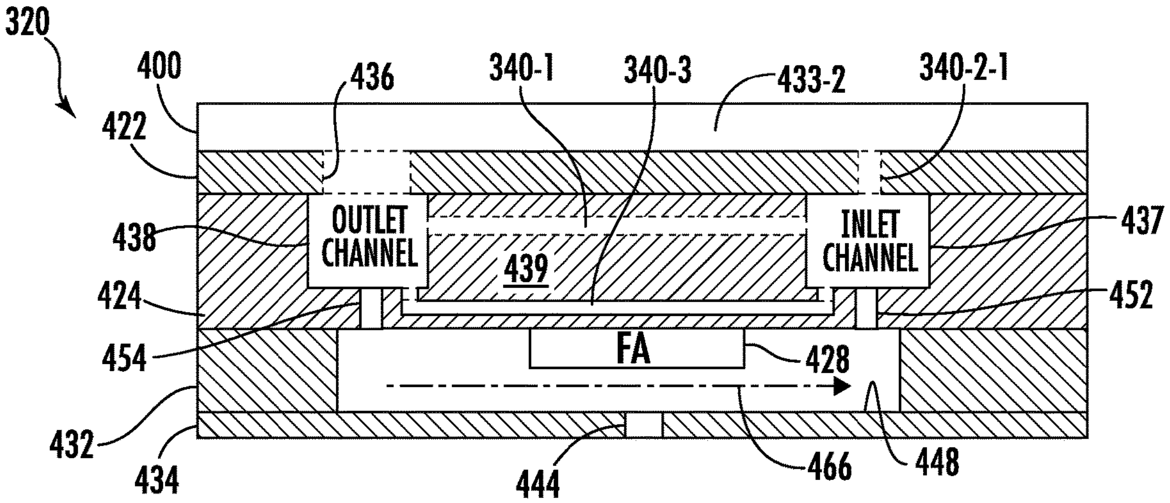
FIG. 4D is an enlarged sectional view of portions of the example fluid ejection die of FIG. 4A.
Figure 4E:
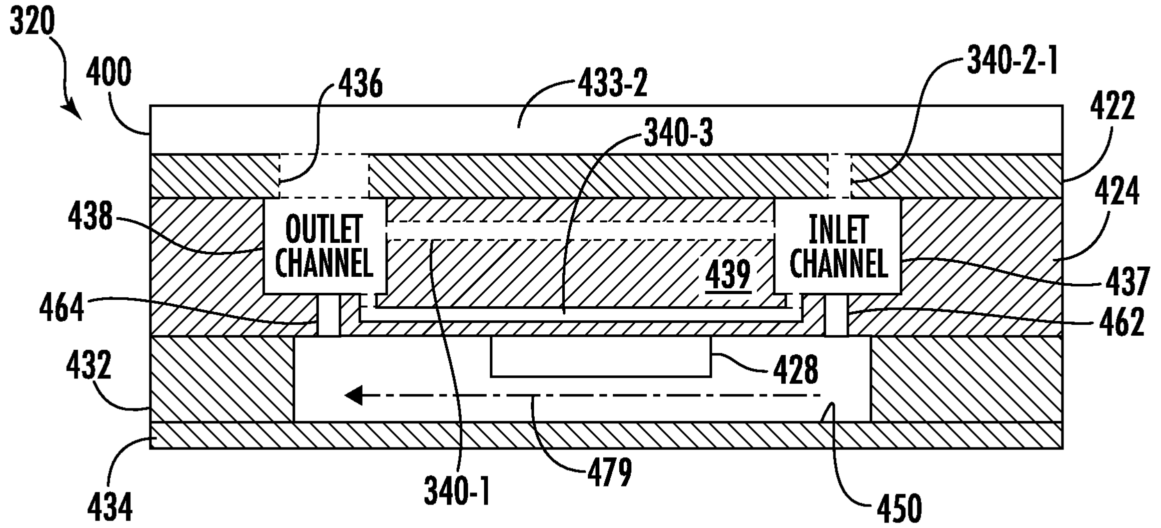
FIG. 4E is an enlarged sectional view of portions of the example fluid ejection die of FIG. 4B.

FIGS. 4A, 4B, 4C, 4D and 4E illustrate portions of an example fluid ejection die 320. FIG. 4A is a perspective view illustrating a first cross-section of portions of an example fluid ejection die 320. FIG. 4A illustrates the recirculation of fluid across fluid ejectors of die 320. FIG. 4B is a perspective view illustrating a second cross-section of portions the example fluid ejection die 320. FIG. 4B illustrates the bypassing of fluid around or past the fluid ejectors. FIG. 4C is a bottom view of portions of the example fluid ejection die of FIG. 4A). In FIG. 4C, the main supply stream or flow of fluid from the fluid source is indicated by lines, recirculating fluid across fluid ejectors, across and between fluid actuator and its associated fluid ejection orifice is represented by dash-dot-dash broken lines and fluid flows that bypass a fluid ejector are represented by dash-dot-dot-dash broken lines. FIGS. 4D and 4E are enlarged sectional views of portions of the fluid ejection die 320 of FIG. 4A. As with the above described die 20, die 320 reduces particle settling by using recirculation channels and enhances cooling by using bypass passages. Fluid ejection die 320 comprises body 400, layer 422, layer 424, fluid actuators 428, layer 432, layer 434 and bypass passages 340-1, 340-2-1, 340-2, and 340-3 (collectively referred to as passages 340).

Body 400 supports layers 422, 424, 432 and 434 while providing fan-out fluid passages 433-1 and 433-2 (collectively referred to as passages 433). In the example illustrated, passage 433-1 receives fluid from a pressurized fluid source 322. Passage 433-2 forms an outlet which ultimately receives fluid from the various bypass passages and directs the fluid back to the pressurized fluid source 322 for recirculation. In one implementation, body 400 comprises a single unitary polymeric body is formed from an epoxy mold compound. In other implementations, body 400 may be formed from other polymers. In one implementation, body 400 is molded to form fan-out fluid passages 433. In other implementations, body 400 may be formed from other materials.

Layer 422 comprises a layer of material extending between body 400 and layer 424. Layer 422 forms an port 435 for fluid passage 433-1 and an port 436 for fluid passage 433-2. In one implementation, port 435 and port 436 comprise fluid holes. In another implementation, port 435 and port 436 comprise slots or channels.

Layer 424 comprises a layer or multiple layers of material forming inlet channel 437 and outlet channel 438. Inlet channel 437 extends within layer 424 from port 435 of layer 422. Outlet channel 438 extends within layer 424 from port 436. Inlet channel 437 and outlet channel 438 are separated by an intervening rib 439 of layer 424. Rib 439 supports fluid actuators 428. Layer 424 may additionally support electrically conductive traces, switches or other electronic componentry associated with the fluid actuators 428.

Although illustrated as two separate layers, in some implementations, layers 422 and 424 may comprise a single unitary or monolithic layer. In some implementations, both of layers 422 and 424 are formed from silicon. In other implementations, layers 422 and 424 may be formed from different materials. In some implementations, layer 424 may be formed from silicon while layer 422 is formed from other materials such as polymers, ceramics, glass and the like. In some implementations, layer 424 may be formed from materials other than silicon.

Layer 432 comprises a layer or multiple layers of a material or materials joined to an underside of layer 424 and forming recirculation passages 448 (shown in FIG. 4D) and bypass passages 450 (shown in FIG. 4C). Recirculation passages 448 comprise fluid passages that extend between and provide for fluid flow from channel 437 to channel 438 between an associated fluid actuator 428 and an ejection orifice 444 associated with the particular fluid actuator 428. In the example illustrated, each of recirculation passages 448 has a ceiling provided by layer 424, internal sides provided by layer 432 and a floor provided by layer 434.

As shown by arrow 463 in FIG. 4C, a mainstream or flow of fluid from fluid source 322 is delivered to each of the fluid ejectors of die 320 across fluid passage 433-1. As shown by arrow 465, a diverted portion of the main flow passes through port 435 into the underlying inlet channel 437. As shown by the dash-dot-dash broken line arrow 466, a portion of the diverted flow passes through inlet 452 into the underlying recirculation passage 448 and flows across the fluid ejector formed by fluid actuator 428 and its corresponding ejection orifice 444. As indicated by arrow 468, a recirculating portion of the fluid, fluid that was not ejected through orifice 444, exits recirculation passage 448 through outlet 454 and enters outlet channel 438. Thereafter, the recirculated portion of the fluid flow circulates along outlet channel 438 and up through port 436 of passage 433-1. As indicated by arrow 470, passage 433-1 directs the recirculating portion of the fluid to the inlet 346 of fluid source 322. In one implementation, each of inlets 452 and outlets 454 comprise fluid holes formed in layer 424. In other implementations, inlet 452 and outlets 454 may be partially formed within layer 432. In some implementations, inlets 452 and outlets 454 may each comprise multiple fluid holes or an array of fluid holes. In some implementations, inlets 452 and outlets 454 may comprise slots or channels.

Recirculation passages 448 supply their respective fluid actuators 428 with fluid for ejection through the corresponding ejection orifice 444. Recirculation passages 448 additionally circulate fluid across their respective fluid actuators 428 from channel 437 to channel 438 to reduce settling.

Layer 434 comprises a layer of material or multiple layers of material joined to layer 432 and forming ejection orifices 444. In some implementations, layer 434 is formed from the same material as layer 432. For example, in some implementations, layers 432 and layer 434 both formed from a photo-imageable epoxy. In some implementations, layer 434 is formed from a different material as layer 432. In some implementations, layers 424, 432 and 434 are formed as a single fluid ejection die which is joined to body 400 by layer 422. In some implementations, layers 422, 424, 432 and 434 are formed as a single fluid ejection die which is otherwise joined to body 400.

As shown in FIG. 4C, the example die 320 comprises three different example types of bypass passages. Each of the example bypass passages 340 extends from layer 424 and is in direct or indirect communication with fluid passage 433-2 which is directly or indirectly connected to the inlet of fluid source 322. Bypass passages 340 facilitate the circulation of fluid from inlet channel 437 to the inlet of the fluid source 322 without flowing through any fluid ejector. With each of the different types of bypass passages, the bypass passages are sized such that a portion of the fluid continues to flow across recirculation passage 448.

Figure 4F:
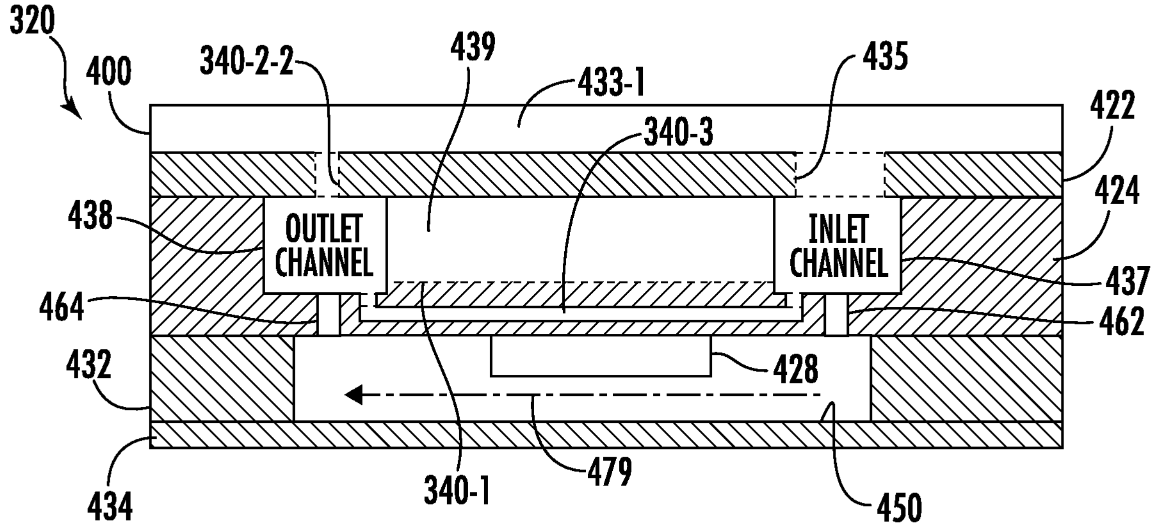
FIG. 4F is an enlarged sectional view of portions of the example fluid ejection die of FIG. 4B.

Bypass passage 340-1 comprises a fluid passage extending directly between inlet channel 437 and outlet channel 438 of layer 424, through the rib 439 that separates the two channels. As shown by FIG. 4D, in some implementations, bypass passage 340-1 may comprise a hole or tunnel within and through rib 439, wherein the interior sides of passage 34-1 are formed by those portions of layer 424 forming rib 439. As shown by FIG. 4F, in some implementations, bypass passage 340-1 may comprise a gap within our interruption of rib 439, wherein the top or ceiling of bypass passage 340-1 is formed by layer 422.

As shown by arrow 463 in FIG. 4C, a supply stream or flow of fluid from fluid source 322 is delivered to each of the fluid ejectors of die 320 to and across fluid passage 433-1. As shown by arrow 465, a diverted portion of the supply flow (diverted portion 465) passes through port 435 into the underlying inlet channel 437. As shown by the dash-dot-dot-dash broken line 467, bypass passage 340-1 directs a bypass portion of the diverted flow 465 through the rib 439 to the outlet channel 438. Thereafter, the bypass portion of the fluid flow flows along outlet channel 438 and up through port 436 of passage 433-2, as indicated by arrow 469. As indicated by arrow 471, passage 433-1 directs the bypass portion to the inlet 346 of fluid source 322. As shown by FIG. 4B, in some implementations, an inlet channels 437 and an outlet channel 438 may be connected by multiple bypass passages 340-1 uniformly or non-uniformly distributed along the length of such channels.

Bypass passage 340-2-1 comprises a fluid passage that extends between inlet channel 437 and fluid passage 433-2. Bypass passage 340-2-1 extends through a roof or ceiling of inlet channel 437 to the port 436 of fluid passage 433-2. In some implementations, the bypass passage 340-2-1 extending through the ceiling may comprise a single slot or opening or may comprise an array of holes. As shown by the dash-dot-dot-dash broken line 473 in FIG. 4C, a portion of the diverted flow 465 that has circulated across the length of inlet channel 437 and that has not circulated across any fluid ejector may pass upwards through fluid bypass 340-2-1 into the overlying outlet channel 433-2. As indicated by arrow 471, passage 433-1 directs the bypass portion to the inlet 346 of fluid source 322. In some implementations, each of the multitude of inlet channels 437 along the length of die 320 may include a bypass passage 340-2-1, similar to the one shown. In other implementations, a portion of the inlet channels may omit bypass passages 340-2-1.

Bypass passage 340-2-2 comprises a fluid passage that extends between outlet channel 437 and fluid passage 433-1. Bypass passage 340-2-2 extends through a roof or ceiling of outlet channel 438 to fluid passage 433-1. In some implementations, the bypass passage 340-2-2 extending through the ceiling may comprise a single slot opening or may comprise an array of holes. As shown by the dash-dot-dot-dash broken line arrow 478 in FIG. 4C, a portion of the supply stream of fluid (indicated by arrow 463) may enter bypass passage 340-2-2 (such as through a floor of passage 433-1), wherein the diverted flow of fluid then flows along outlet channel 438, through port 436 and along passage 433-2 back to the fluid source 322. In some implementations, each of the multitude of outlet channels 438 along the length of die 320 may include a bypass passage 340-2-2, similar to the one shown. In other implementations, a portion of the outlet channels may omit bypass passages 340-2-2.

Bypass passage 340-3 comprises a fluid passage that extends through a floor of inlet channel 437, across and within layer 424 to the outlet channel 438. As shown by arrow 463 in FIG. 4C, a mainstream or flow of fluid from fluid source 322 is delivered to each of the fluid ejectors of die 320 to and across fluid passage 433-1. As shown by FIG. 4C, a diverted portion (diverted flow 465) of the supply flow passes 463 through port 435 into the underlying inlet channel 437. As shown by the dash-dot-dot-dash broken line 475, bypass passage 340-3 directs a bypass portion of the diverted flow 465 through the rib 439 to the outlet channel 438. Thereafter, the bypass portion of the fluid flow circulates along outlet channel 438 and up through port 436 of passage 433-2, as indicated by arrow 477. As indicated by arrow 471, passage 433-2 directs the bypass portion to the inlet 346 of fluid source 322.

Although die 320 is illustrated as including each of the three different types of bypass passages 340-1, 340-2 and 343-3, in other implementations, fluid ejection die 320 may comprise different combinations of less than each of the three different types of bypass passages 340. For example, in some implementations, die 320 may just include bypass passages 340-1, just include bypass passages 340-2 or may just include bypass passages 340-3. In some implementations, die 320 may include two of the three different types of fluid bypass passages 340.

As shown by FIG. 4E, in the example illustrated, die 320 additionally comprises bypass passage 450. Bypass passage 450 comprises a fluid passage that extends within chamber layer 432 between holes or slots connected to inlet channel 437 and outlet channel 438. Bypass passage 450 provides for fluid flow from channel 437 to channel 438 without passing a fluid actuator that is to eject fluid through a corresponding ejection orifice. In the example illustrated, bypass passage 450 has a ceiling provided by layer 424, internal sides provided by layer 432 and a floor provided by layer 434. In other implementations, bypass passage 450 may be wholly contained within layer 432.

Bypass passage 450 receives fluid from channel 437 through an inlet 462 and discharges fluid to channel 438 through an outlet 464. In one implementation, each of inlets 462 and outlets 464 comprise fluid holes formed in layer 424. In other implementations, inlet 462 and outlets 464 may be partially formed within layer 432. In some implementations, inlets 462 and outlets 464 may each comprise multiple fluid holes or an array of fluid holes. In some implementations, inlets 462 and outlets 464 may comprise slots or channels.

As indicated by arrow 479 in FIG. 4E, bypass passage 450 allows a portion of the fluid being supplied by channel 437 to bypass recirculation passages 448 and its corresponding fluid actuator 428. As a result, flow between channels 437 and 438 is increased. The increased flow of fluid may assist in absorbing and carrying away excess heat to provide convective cooling for fluid ejection die 320. In some implementations, bypass passage 450 and the associated inlet 462 and outlet 464 may be omitted.

Figure 5A:
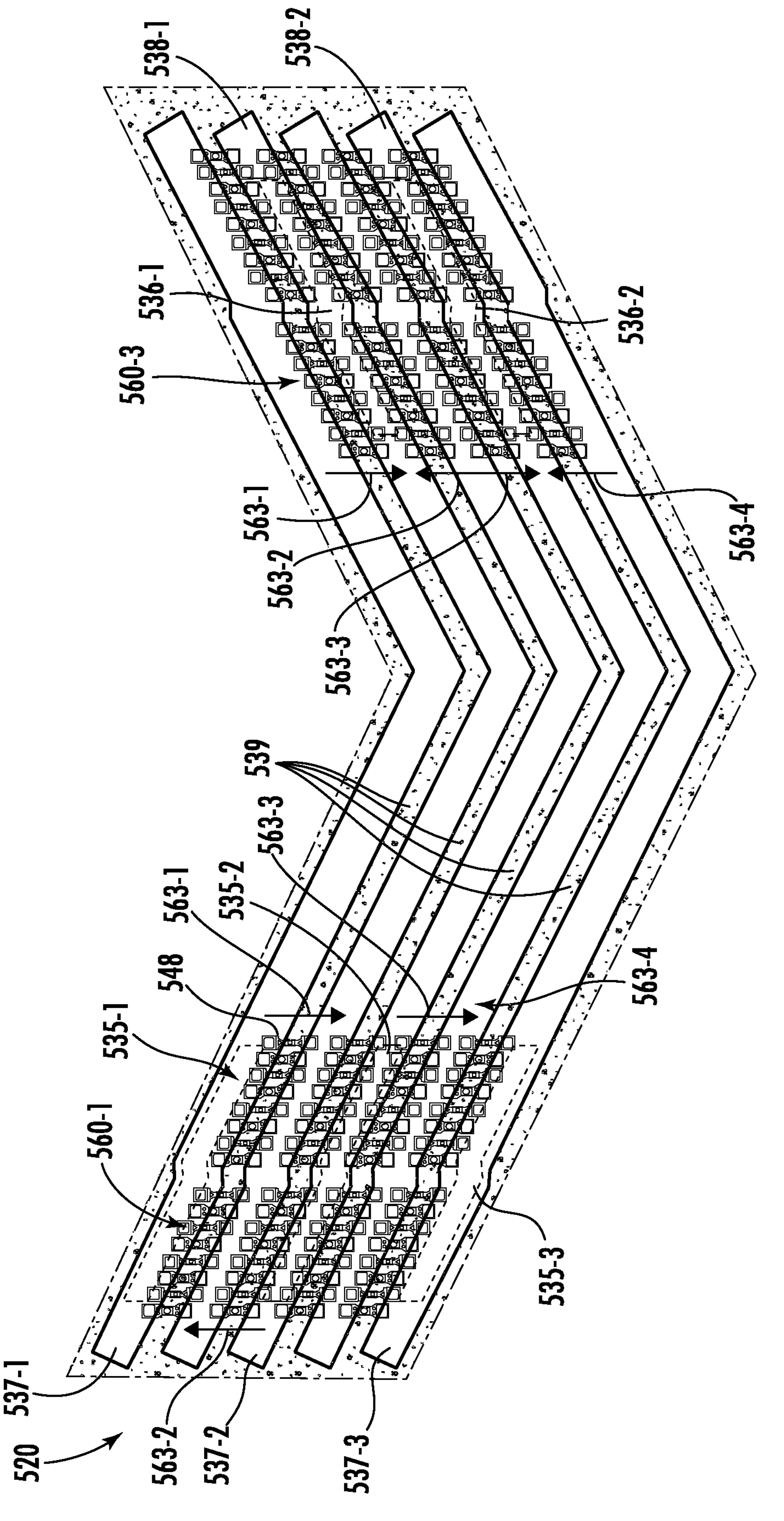
FIG. 5A is a bottom view illustrating portions of an example fluid ejection die.
Figure 5B:
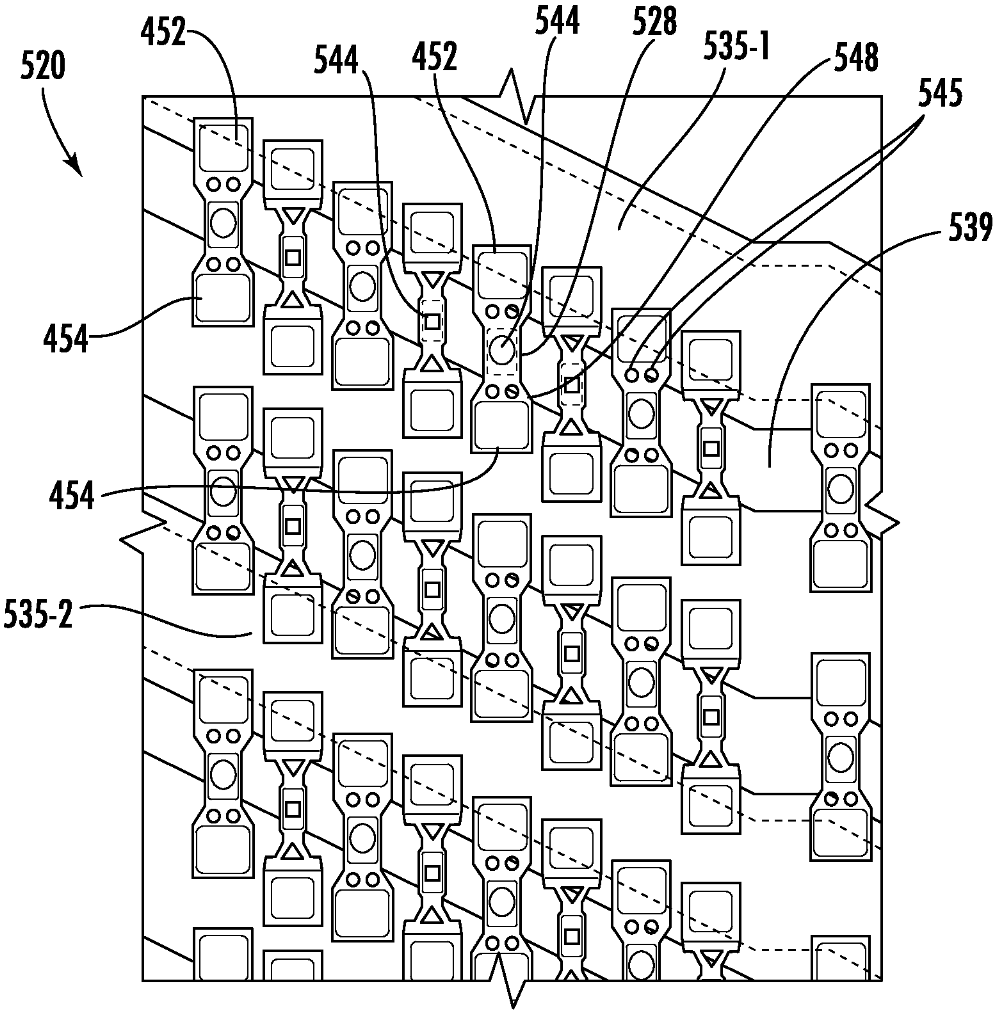
FIG. 5B is an enlarged view of portions of the fluid ejection die of FIG. 5A.
Figure 5C:
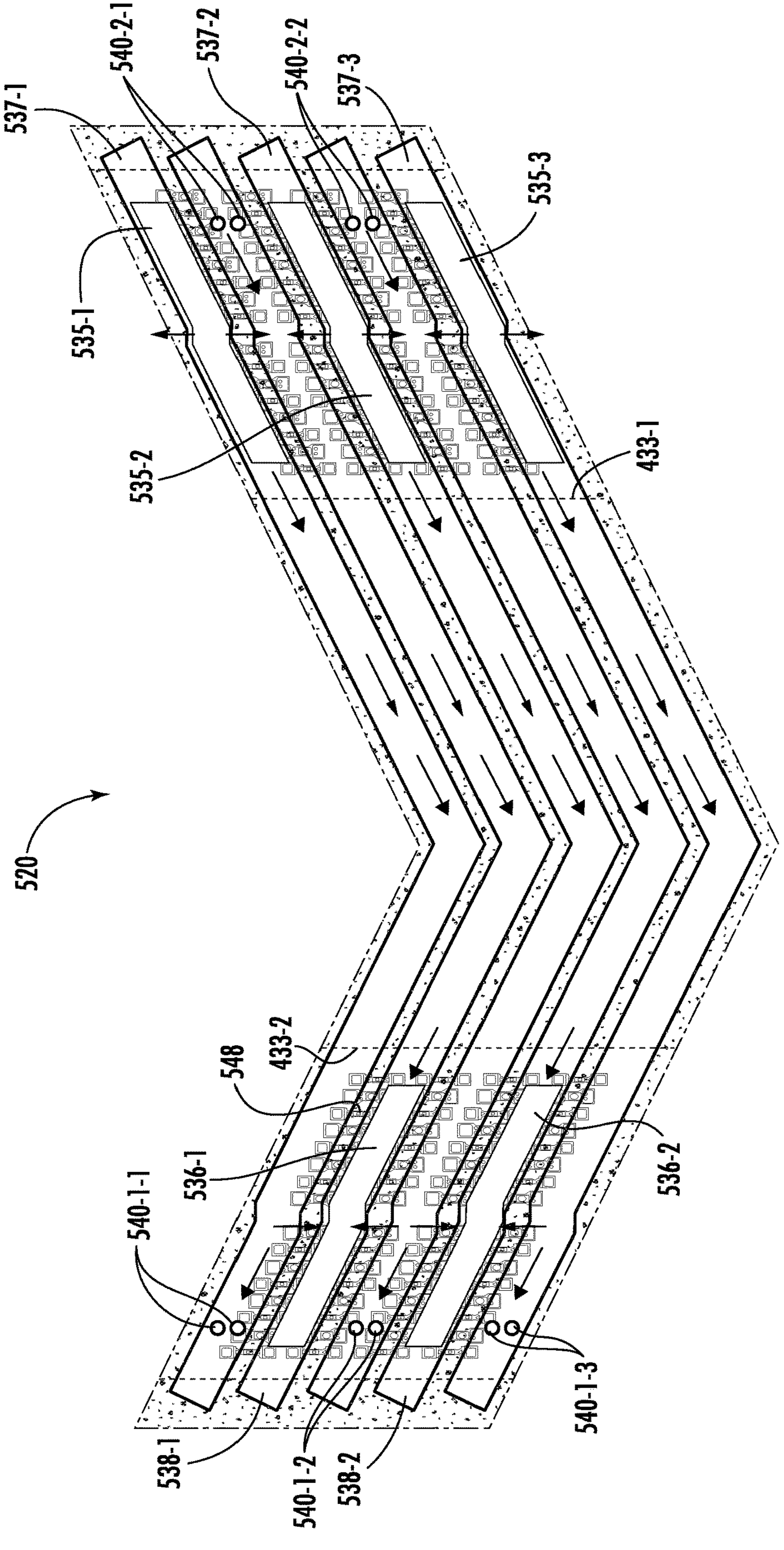
FIG. 5C is a top view illustrating portions of the example fluid ejection die of FIG. 5A.
Figure 5D:
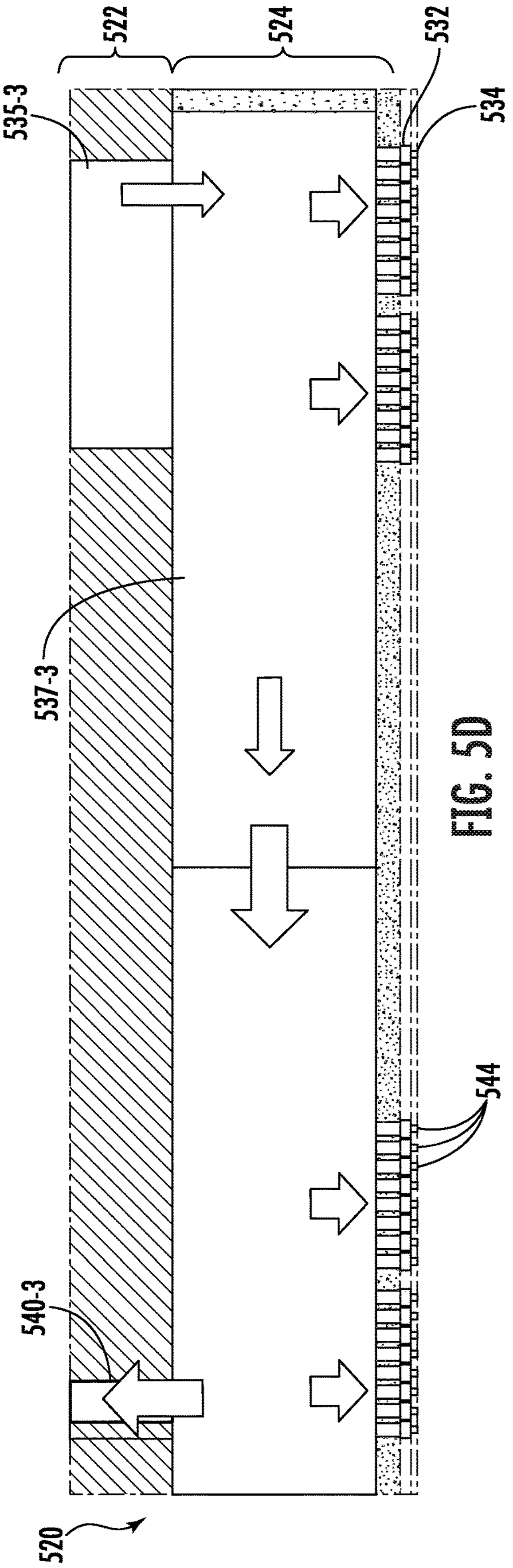
FIG. 5D is a side view illustrating portions of the example fluid ejection die of FIG. 5A.

FIGS. 5A, 5B, 5C and 5D illustrate an example fluid ejection die 520. Such figures illustrate an example arrangement of bypass passages that are similar to bypass passages 340-1 and 340-2 described above. For ease of illustration, portions of the die are transparently shown with the layer containing the bypass passages being stippled. FIGS. 5A and 5B are bottom views of the die while FIG. 5C is a sectional view from above the bypass passages. FIG. 5D is a sectional view along a length of the die 520.

As shown by FIG. 5D, die 520 comprises layers 522, 524, 532 and 534 which substantially correspond to layers 422, 424, 432 and 434, respectively, of die 320. Layer 522 extends between body 400 (shown in FIG. 4A) and layer 524. In the example illustrated, layer 522 comprises three ports 535-1, 535-2, 535-3 (collectively referred to as ports 535) and two ports 536-1 and 536-2 (collectively referred to as ports 536). Ports 535 deliver fluid from a pressurized fluid source 322 through a supply passage such as passage 433-1 shown in FIG. 4A. Ports 536 deliver fluid to the pressurized fluid source 322 through a passage such as passage 433-2 shown in FIG. 4A.

Layer 524 forms a series of alternating inlet and outlet channels, wherein the inlet channels are individually connected to ports 535 and wherein the outlet channels are individually connected to ports 536. FIG. 5B illustrates three example inlet channels 537-1, 537-2 and 537-3 and two example outlet channels 538-1 and 538-2. Inlet channels 537-1, 527-2 and 537-3 receive pressurized fluid through ports 535-1, 525-2 and 535-3, respectively, of layer 522 while outlet channels 538-1 and 538-2 discharge fluid through ports 536-1 and 536-2, respectively, of layer 522. Similar to channels 437 and 438 of die 320, channels 537 and 538 are separated by intervening walls or ribs 539 (shown in FIG. 5A) which support fluid actuators 528 (shown in FIG. 5C) generally opposite to an ejection orifice 544, formed in layer 534. In the example illustrated, each of channels 537 and 538 is Chevron-shaped, facilitating a staggering offset relationship between different ejection orifices 544 of different fluid ejectors arranged between the channels 537, 538.

In one implementation, layer 524 may comprise a layer or multiple layers of silicon. In yet other implementations, layer 524 may comprise other materials.

Layer 532 extends over layer 524 between layer 524 and layer 534. Layer 532 forms a two-dimensional array of recirculation passages. As shown by FIGS. 5A and 5C, recirculation passages 548 connect adjacent inlet channels 537 and outlet channels 538. Each of circulation passages 548 receives fluid from an overlying inlet channel 537 through a fluid feed hole 452 and discharges fluid to an overlying outlet channel 538 through a fluid discharge hole 454. In the example illustrated, recirculation passages 548 are arranged in sets 560-1, 560-2, 560-3 and 560-4 and sets 562-1, 562-2, 562-3 and 562-4. Sets 560-1 and 562-1 are arranged opposite ends of channels 537-1 and 538-1, interconnecting channels 537-1 and 538-1. Sets 560-2 and 562-2 are arranged opposite ends of channels 537-2 and 538-1, interconnecting channels 537-2 and 538-1. Sets 560-3 and 562-3 are arranged opposite ends of channels 537-2 and 538-2, interconnecting channels 537-2 and 538-2. Sets 560-4 and 562-4 are arranged opposite ends of channels 537-3 and 538-2, interconnecting channels 537-3 and 538-2.

As indicated by arrows 563-1, sets 560-1 and 562-1 direct the flow of fluid from channel 537-1, across associated fluid actuators 528 and ejection orifices 544, to channel 538-1. As indicated by arrows 563-2, sets 560-2 and 562-2 direct the flow of fluid from channel 537-2, across associated fluid actuators 528 and ejection orifices 544, to channel 538-1. As indicated by arrows 563-3, sets 560-3 and 562-3 flow from channel 537-2, across associated fluid actuators 528 and ejection orifices 544, to channel 538-2. As indicated by arrows 563-4, sets 560-4 and 562-4 direct the flow of fluid from channel 537-3, across associated fluid actuators 528 and ejection orifices 544, to channel 538-2.

In the example illustrated, layer 532 additionally forms a pair of spaced pillars 545 on opposite sides of each fluid actuator 528 and ejection orifice 544. Pillars 545 are spaced to allow fluid flow therebetween and past such pillars. Pillars 545 serve to filter the fluid flowing across the fluid actuator 528 and its associated ejection orifice 544. In some implementations, other arrangements of pillars 545 or other filtering mechanisms may be employed. In other implementations, pillars 545 may be omitted.

Bypass passages 540-1-1, 540-1-2, 540-1-3 (collectively referred to as bypass passages 540-1) are each similar to bypass passages 340-2-1 described above. Bypass passages 540-1 comprise fluid passages that extend through a roof or ceiling of a respective inlet channel to the port 436 of fluid passage 433-2 which extends across the passages 537, 538. In the example illustrated, bypass passage 540-1-2 extends through the ceiling of inlet channel 537-1 into communication with the overlying passage 433-2 (shown in FIG. 4A). Bypass passage 540-1-2 extends through the ceiling of inlet channel 537-2 into communication with the overlying passage 433-2. Bypass passage 540-1-3 extends through the ceiling of inlet channel 537-3 into communication with the overlying passage 433-2. In the example illustrated, each of bypass passages 540-1 comprises an array of holes, such as a pair of holes. In other implementations, each of bypass passages 540-1 may comprise a single opening or a slot. Bypass passages 540-1 direct a portion of the fluid supplied to each of the inlet channels 537 to flow directly to an outlet channel 538, without flowing across a fluid ejector, without flowing between a fluid actuator 528 and its associated ejection orifice 544. As a result, overall fluid flow across the die 520 is increased for enhanced convective cooling of die 520.

Bypass passages 540-2-1 and 540-2-2 (collectively referred to as bypass passages 540-2) extend through the ceilings of outlet channels 538-1 and 538-2, respectively, into communication with the overlying passage 433-1 which extends across each of channels 537, 538. Bypass passages 540-2 provide additional fluid flow into outlet channels 538 and across outlet channels 538 to provide additional convective cooling. In the example illustrated, each of bypass passages 540-2 comprises an array of holes, such as a pair of holes. In other implementations, each of bypass passages 540-2 may comprise a single opening or a slot. In some implementations, bypass passages 540-1 or bypass passages 540-2 may be omitted.

Figure 6A:
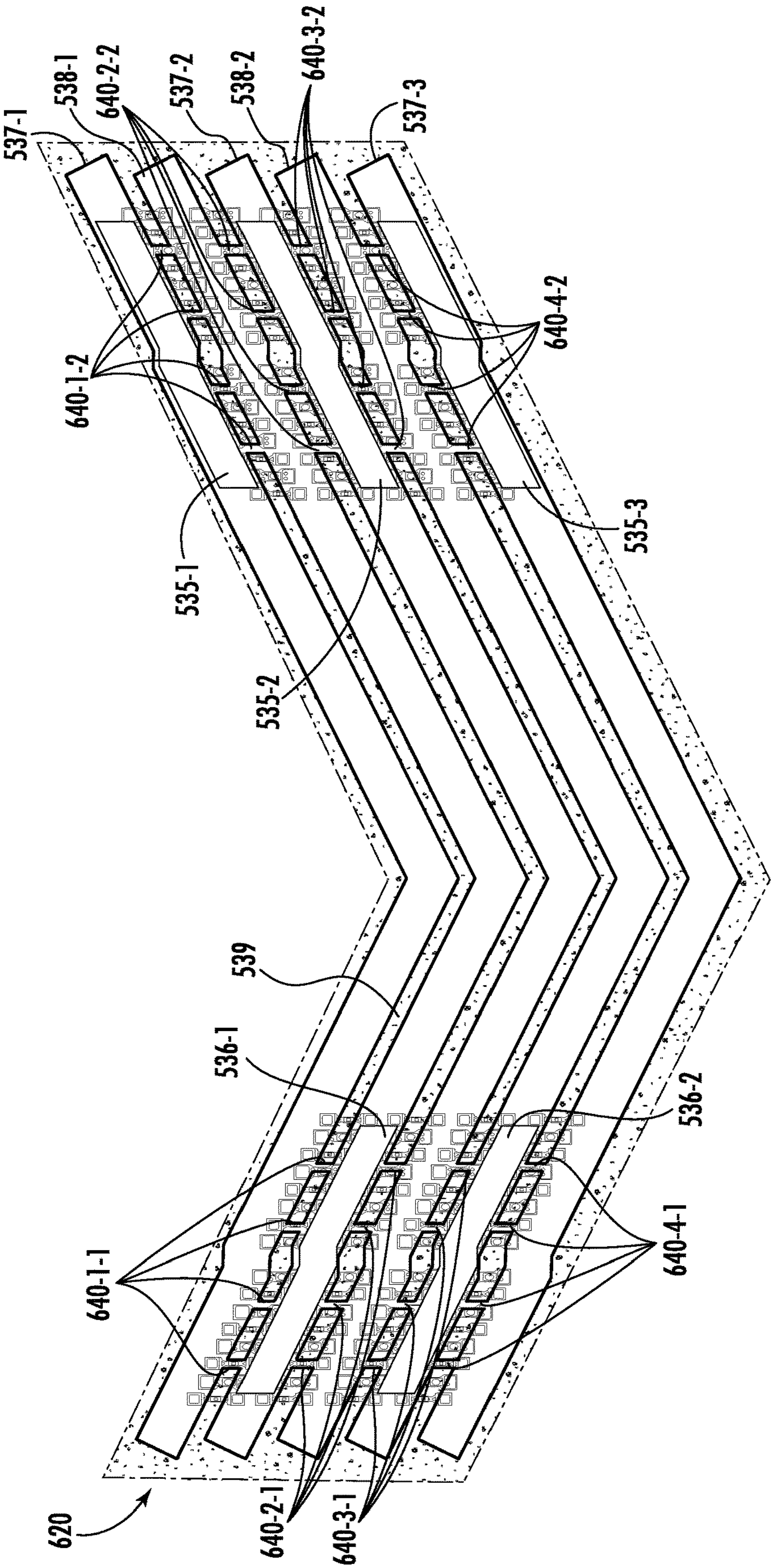
FIG. 6A is a top view illustrating portions of an example fluid ejection die.
Figure 6B:
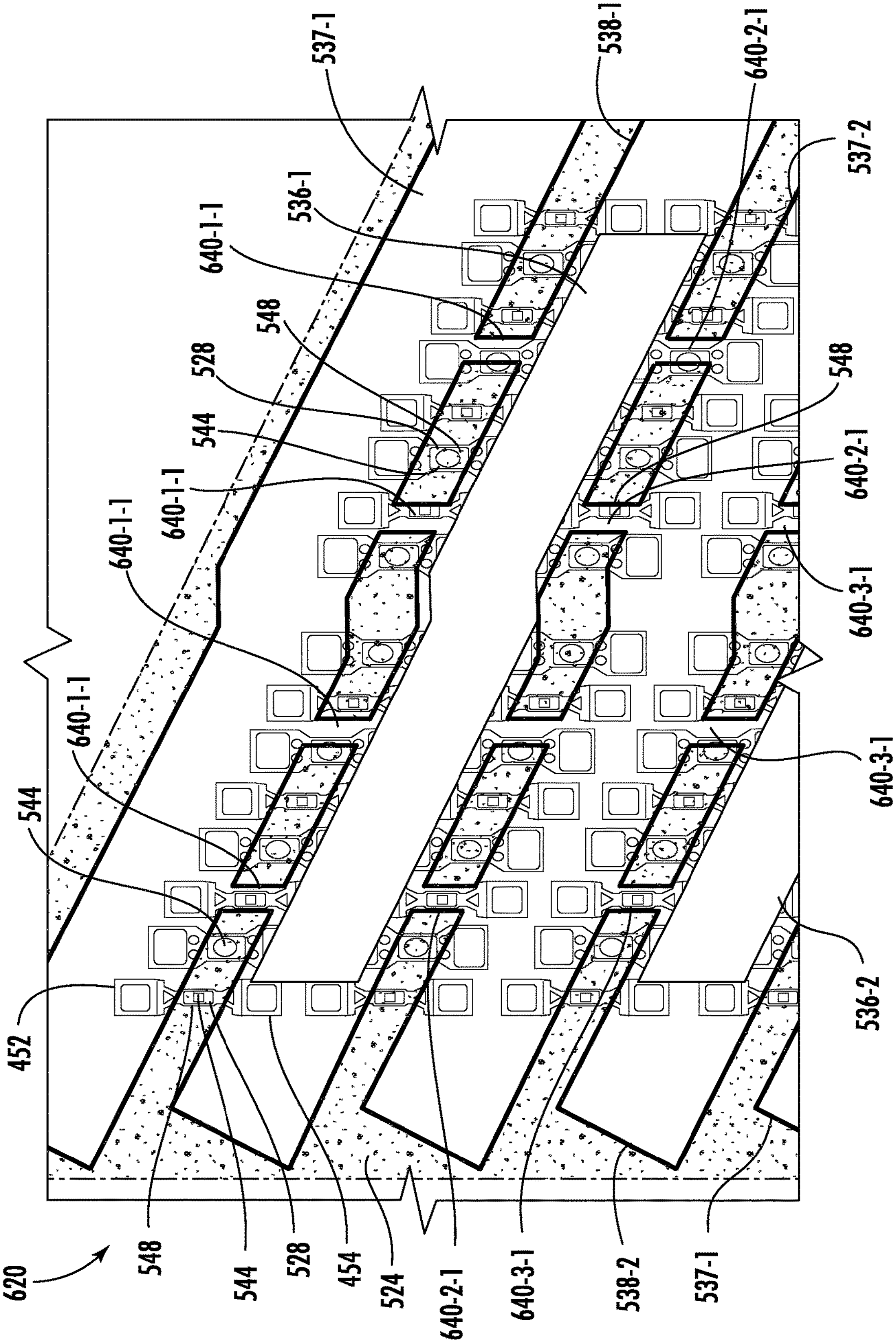
FIG. 6B is an enlarged view of the example fluid ejection die of FIG. 6A.

FIGS. 6A and 6B illustrate portions of an example fluid ejection die 620. For ease of illustration, portions of the die 620 are transparently shown with the layer containing the bypass passages being stippled. FIG. 6A is a sectional view from above the bypass passages. FIG. 6B is an enlarged view of a portion of die 620. Die 620 illustrates one example arrangement of bypass passages which are similar to bypass passage 340-1 described above. Die 620 is similar to die 520 except that die 620 comprises bypass passages 640-1-1, 640-1-2, 640-2-1, 640-2-2, 640-3-1, 640-3-2, 640-4-1 and 640-4-2 (collectively referred to as bypass passages 640). The remaining components of die 620 which correspond to components of die 520 are numbered similarly.

Each of bypass passages 640 extends through a rib 539 and provides fluid communication between a respective fluid inlet channel 537 and one of fluid outlet channels 538. Bypass passages 640 are sized to circulate fluid from inlet channels 537 to outlet channels 538 at a rate such that fluid is directed across recirculation passages 548 at a sufficient rate to meet the rate at which fluid is being ejected and to also provide sufficient recirculation to inhibit remnant air bubble accumulation and viscous plug formation.

In the example illustrated, bypass passages 640-1-1, 640-2-2, 640-3-1 and 640-4-1 are located on a first end of channels 537, 538, proximate to ports 536-1, 536-2. Bypass passages 640-1-2, 640-2-2, 640-3-2 and 640-4-2 are located on a second opposite end of channels 537, 538, proximate to ports 535-1, 535-2 and 535-3. Bypass passages 640-1-1 and 640-1-2 direct the flow of fluid from inlet channel 537-1 to outlet channel 538-1. Bypass passages 640-2-1 and 640-2-2 direct the flow of fluid from inlet channel 537-22 outlet channel 538-1. Bypass passages 640-3-1 and 640-3-2 direct the flow of fluid from inlet channel 537-2 to outlet channel 538-2. Bypass passages 640-4-1 and 640-4-2 direct the flow of fluid from inlet channel 537-3 to outlet channel 538-2. The particular size, number and distribution of bypass passages 640 may vary from one fluid ejection die to another fluid ejection die depending upon the size and number of fluid ejectors, the rate at which fluid is to be ejected in the rate at which fluid is supplied to inlet channels 537.

Figure 7A:
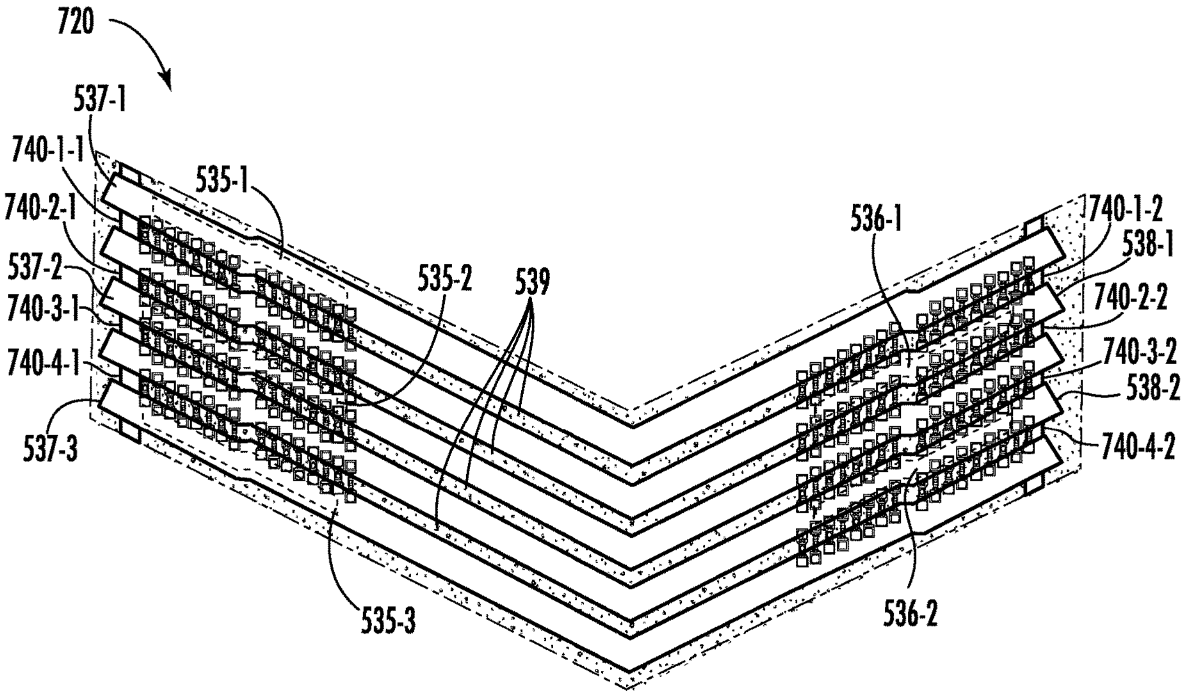
FIG. 7A is a bottom view filtering portions of an example fluid ejection die.
Figure 7B:
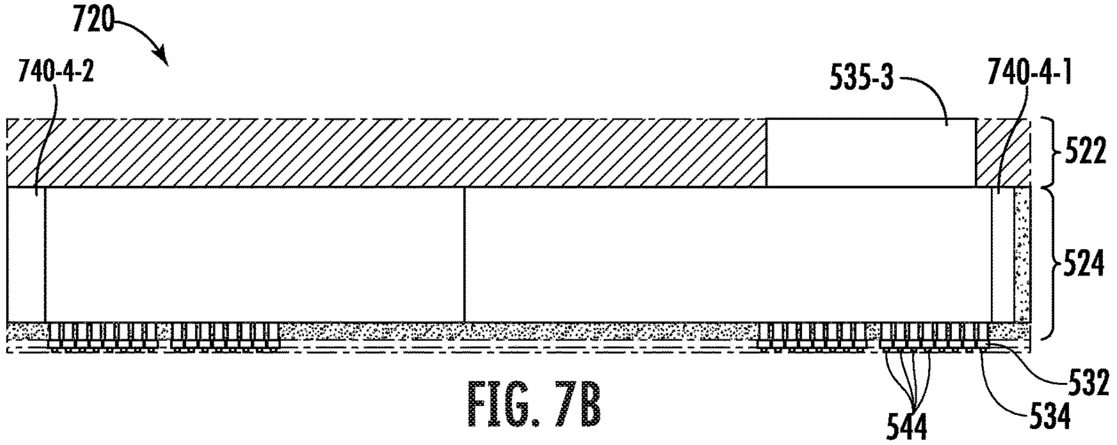
FIG. 7B is a side view illustrating portions of the example fluid ejection die of FIG. 7A.

FIGS. 7A and 7B illustrate portions of an example fluid ejection die 720 having bypass passages located on the ends of the inlet and outlet channels. For ease of illustration, portions of the die 720 are transparently shown with the layer containing the bypass passages being stippled. FIG. 7A is a bottom view of the die 720. FIG. 7B is a sectional view along a length of the fluid ejection die 720 shown in FIG. 7A. Die 720 is similar to die 520 except that die 720 comprises bypass passages 740-1-1, 740-1-2, 740-2-1, 740-2-2, 740-3-1, 740-3-2, 740-4-1 and 740-4-2 (collectively referred to as bypass passages 740). The remaining components of die 720 which correspond to components of die 520 are numbered similarly.

Bypass passages 740-1-1 and 407-1-2 direct the flow of fluid from inlet channel 537-1 to outlet channel 538-1. Bypass passages 740-2-1 and 740-2-2 direct the flow of fluid from inlet channel 537-2 to outlet channel 538-1. Bypass passages 740-3-1 and 740-3-2 direct the flow of fluid from inlet channel 537-2 to outlet channel 538-2. Bypass passages 740-4-1 and 740-4-2 direct the flow of fluid from inlet channel 537-3 to outlet channel 538-2. The particular size, number and distribution of bypass passages 740 may vary from one fluid ejection die to another fluid ejection die depending upon the size and number of fluid ejectors, the rate at which fluid is to be ejected in the rate at which fluid is supplied to inlet channels 537.

Figure 8A:
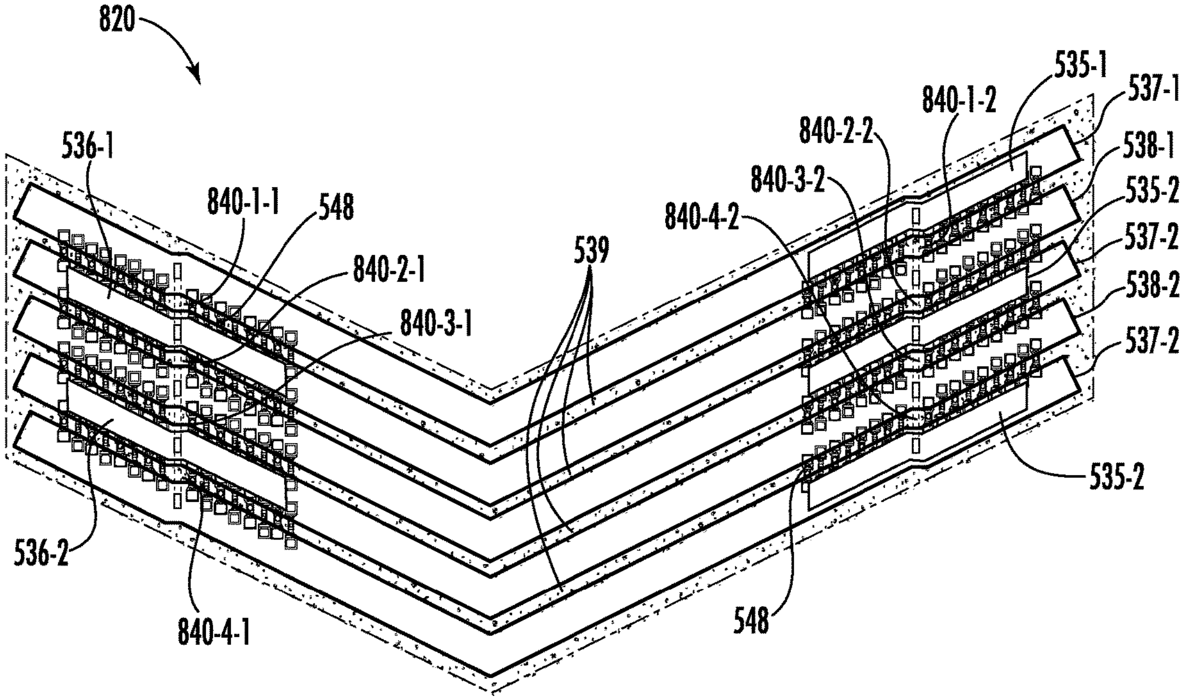
FIG. 8A the top view illustrating portions of an example fluid ejection die.
Figure 8B:
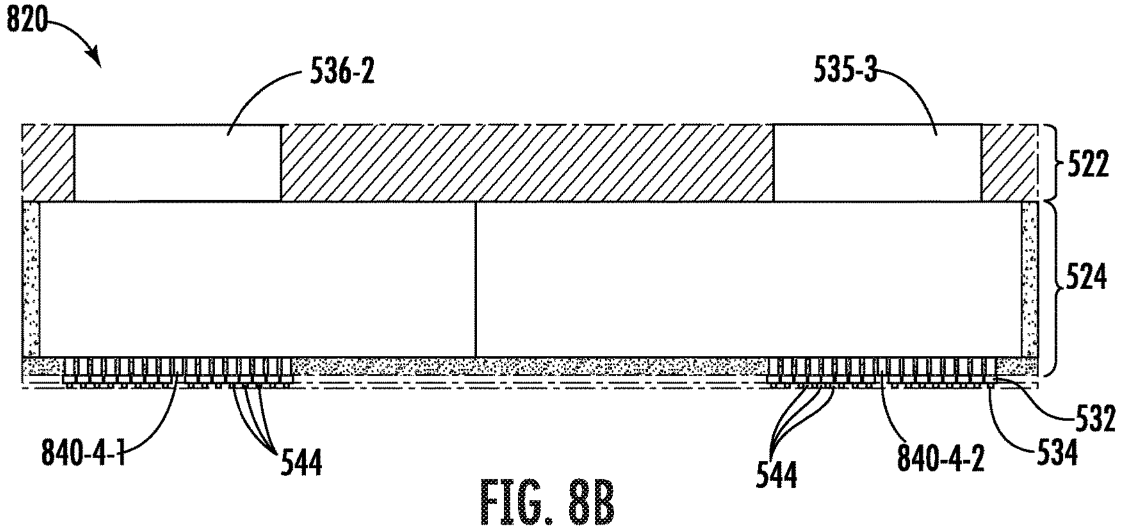
FIG. 8B is a side view illustrating portions of the example fluid ejection die of FIG. 8A.

FIGS. 8A and 8B illustrate portions of an example fluid ejection die 820. For ease of illustration, portions of the die are transparently shown with the layer containing the bypass passages being stippled. FIG. 8A is a bottom view of fluid ejection die 820. FIG. 8B is a sectional view along a length of a portion of die 820. Die 820 illustrates one example arrangement of bypass passages which are similar to bypass passage 340-3 described above. Die 820 is similar to die 520 except that die 820 comprises bypass passages 840-1-1, 840-1-2, 840-2-1, 840-2-2, 840-3-1, 840-3-2, 840-4-1 and 840-4-2 (collectively referred to as bypass passages 840). The remaining components of die 820 which correspond to components of die 520 are numbered similarly.

Each of bypass passages 840 comprises a fluid passage that extends through a floor of a respective one of inlet channels 537, across and within layer 524 to an adjacent one of outlet channels 538. Bypass passages 840-2-1 and 840-2-2 direct the flow of fluid from inlet channel 537-22 outlet channel 538-1. Bypass passages 840-3-1 and 840-3-2 direct the flow of fluid from inlet channel 537-2 to outlet channel 538-2. Bypass passages 840-4-1 and 840-4-2 direct the flow of fluid from inlet channel 537-3 to outlet channel 538-2.

In the example illustrated, each of inlet channels 537 has a single bypass passage 840 at its two opposite ends. The bypass passages 840 are centrally located amongst the respective set of recirculation passages 548 to provide a more symmetric bypass flow of fluid. In other implementations, each of inlet channel 537 may have more than one bypass passage 840 at each end. In some implementations, bypass passages 840 may be provided on a single end of inlet channels 537. In some implementations, bypass passage may be provided at the ends of channels 537. The particular size, number a single bypass passage 840 and distribution of bypass passages 840 may vary from one fluid ejection die to another fluid ejection die depending upon the size and number of fluid ejectors, the rate at which fluid is to be ejected in the rate at which fluid is supplied to inlet channels 537.

Each of dies 520, 620, 720 and 820 illustrate different types of fluid bypass passages. Although each of dies 520, 620, 720 and 820 is illustrated having a single type of fluid bypass passage, in some implementations, each of such dies 520, 620, 720 and 820 may additionally include any of the other types of fluid bypass passages. For example, die 520 may additionally include bypass passages 640, 740 and/or 840. Die 620 may additionally include bypass passages 540, 740 and/or 840. Die 720 may additionally include bypass passages 540, 640 and/or 840. Die 820 may additionally include bypass passages 540, 640 and/or 840. Each of dies 520, 620, 720 and 820 may still additionally include fluid bypass passages 450 (shown and described above with respect to FIG. 4E) in layer 532.

The collection of bypass passages provided in a fluid ejection die are sized to circulate fluid from inlet channels 537 to outlet channels 538 at a rate such that fluid is directed across recirculation passages 548 at a sufficient rate to meet the rate at which fluid is being ejected and to also provide sufficient recirculation to inhibit remnant air bubble accumulation and viscous plug formation. In each of dies 520, 620, 720 and 820, the fluid ejection die may comprise a total number of recirculation passages extending across fluid actuators for ejection of fluid by the fluid actuator through corresponding ejection orifices, wherein the fluid ejection die comprises a total number of bypass passages connecting the closed inlet channel to an outlet (provided by passage 433-2) such that a first portion of fluid within the closed inlet channel is to flow to the outlet through the recirculation passages and a second portion of the fluid within the closed inlet channel is to flow to the outlet through the bypass passages. The various combinations of bypass passages employed in each die may vary from one fluid ejection die to another fluid ejection die depending upon the size and number of fluid ejectors, the rate at which fluid is to be ejected in the rate at which fluid is supplied to inlet channels 537.

Although the present disclosure has been described with reference to example implementations, workers skilled in the art will recognize that changes may be made in form and detail without departing from disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A fluid ejection die comprising:

a fluid actuator;

a substrate supporting the fluid actuator, the substrate comprising:

a closed inlet channel having an inlet opening for connection to an outlet of a fluid source, wherein the closed inlet channel comprises a ceiling and wherein the bypass passage extends through a portion of the ceiling and wherein the bypass passage comprises a hole of an array of holes extending through the portion of the ceiling; and an outlet channel having an outlet opening of a first size for connection to an inlet of the fluid source;

a chamber layer supported by the substrate, the chamber layer comprising a recirculation passage associated with the fluid actuator to supply fluid for ejection by the fluid actuator through an ejection orifice and to circulate fluid across the fluid actuator from the closed inlet channel to the outlet channel; and a bypass passage of a second size less than the first size in the substrate to connect the inlet channel to the inlet of the fluid source while bypassing any fluid actuator provided for ejecting fluid through an ejection orifice.

2. The fluid ejection die of claim 1, wherein the closed inlet channel and the outlet channel are separated by a rib therebetween, wherein the bypass passage extends through the rib.

3. The fluid ejection die of claim 1, wherein the closed inlet channel has a floor, wherein the bypass passage extends through the floor to the outlet channel.

4. The fluid ejection die of claim 1, wherein the closed inlet channel and the outlet channel are separated by a rib therebetween, wherein the closed inlet channel has a floor and a ceiling, and wherein the bypass passage connects the closed inlet channel to the outlet by extending through two of the rib, the ceiling and the floor while bypassing any fluid actuator provided for ejecting fluid through an ejection orifice.

5. The fluid ejection die of claim 1, wherein the closed inlet channel and the outlet channel are separated by a rib therebetween, wherein the closed inlet channel has a floor and a ceiling, wherein the bypass passage connects the closed inlet channel to the outlet by extending through one of the rib, the ceiling and the floor without extending across any fluid actuator provided for displacing fluid through an ejection orifice and wherein the fluid ejection die further comprises a second bypass passage in the chamber layer connecting the closed inlet channel to the outlet channel while bypassing any fluid actuator provided for ejecting fluid through an ejection orifice.

6. The fluid ejection die of claim 1 further comprising a second recirculation passage associated with a second fluid actuator to supply fluid for ejection by the second fluid actuator through a second ejection orifice and to circulate fluid across the second fluid actuator from the closed inlet channel to the outlet channel, wherein the closed inlet channel and the outlet channel are separated by a rib and wherein the bypass passage extends through the rib between the recirculation passage and the second recirculation passage.

7. The fluid ejection die of claim 1, wherein the recirculation passage is one of a series of recirculation passages and wherein the bypass passage extends from the closed inlet channel to the outlet channel at an end of the series of recirculation passages.

8. The fluid ejection die of claim 1 further comprising a body providing the inlet and the outlet of the fluid source wherein the bypass passage extends through the substrate directly to the inlet of the fluid source.

9. A fluid ejection die comprising:

a fluid actuator;

a substrate supporting the fluid actuator, the substrate comprising:

a closed inlet channel having an inlet opening for connection to an outlet of a fluid source; and an outlet channel having an outlet opening of a first size for connection to an inlet of the fluid source;

a chamber layer supported by the substrate, the chamber layer comprising a recirculation passage associated with the fluid actuator to supply fluid for ejection by the fluid actuator through an ejection orifice and to circulate fluid across the fluid actuator from the closed inlet channel to the outlet channel; and a bypass passage of a second size less than the first size in the substrate to connect the inlet channel to the inlet of the fluid source while bypassing any fluid actuator provided for ejecting fluid through an ejection orifice, wherein the fluid ejection die comprises a total number of recirculation passages extending across fluid actuators for ejection of fluid by the fluid actuator through corresponding ejection orifices and wherein the fluid ejection die comprises a total number of bypass passages connecting the closed inlet channel to the outlet such that a first portion of fluid within the closed inlet channel is to flow to the outlet through the recirculation passages and a second portion of the fluid within the closed inlet channel is to flow to the outlet through the bypass passages.

10. The fluid ejection die of claim 9, wherein the closed inlet channel and the outlet channel are separated by a rib therebetween, wherein the bypass passage extends through the rib.

11. The fluid ejection die of claim 9, wherein the closed inlet channel has a floor, wherein the bypass passage extends through the floor to the outlet channel.

12. The fluid ejection die of claim 9, wherein the closed inlet channel and the outlet channel are separated by a rib therebetween, wherein the closed inlet channel has a floor and a ceiling, wherein the bypass passage connects the closed inlet channel to the outlet by extending through one of the rib, the ceiling and the floor without extending across any fluid actuator provided for displacing fluid through an ejection orifice and wherein the fluid ejection die further comprises a second bypass passage in the chamber layer connecting the closed inlet channel to the outlet channel while bypassing any fluid actuator provided for ejecting fluid through an ejection orifice.

13. A method for forming a fluid ejection die, the method comprising:

providing a substrate supporting a fluid actuator, the substrate forming a closed inlet channel and an outlet channel, the outlet channel having an outlet opening of a first size for connection to an inlet of a fluid source, wherein the inlet channel has a floor and a ceiling;

forming a second layer on the substrate, the second layer comprising a recirculation passage associated with the fluid actuator to supply fluid for ejection by the fluid actuator through an ejection orifice and to circulate fluid across the fluid actuator from the closed inlet channel to the outlet channel; and forming a bypass passage of a second size less than the first size in the substrate to connect the closed inlet channel to the inlet of the fluid source while bypassing any fluid actuator provided for ejecting fluid through an ejection orifice, wherein the bypass passage comprises a hole of an array of holes extending through a portion of the ceiling.

14. The method of claim 13, wherein the inlet channel and the outlet channel are separated by a rib therebetween, wherein the bypass passage connects the inlet channel to the inlet of the fluid source by extending through one of the rib, the ceiling and the floor without extending across any fluid actuator provided for displacing fluid through an ejection orifice.

15. The method of claim 13, wherein the closed inlet channel has a floor, wherein the bypass passage extends through the floor to the outlet channel.

16. The method of claim 13, wherein the closed inlet channel and the outlet channel are separated by a rib therebetween, wherein the closed inlet channel has a floor and a ceiling, and wherein the bypass passage connects the closed inlet channel to the outlet by extending through two of the rib, the ceiling and the floor while bypassing any fluid actuator provided for ejecting fluid through an ejection orifice.

* * * * *